US009399591B2

(12) United States Patent
Hernandez-Mena

(10) Patent No.: US 9,399,591 B2
(45) Date of Patent: Jul. 26, 2016

(54) NITROGEN-CONTAINING COMPOUNDS FOR BACTERIAL CONTROL IN WATER BASED FLUIDS

(71) Applicant: BAKER HUGHES INCORPORATED, Houston, TX (US)

(72) Inventor: Roy Hernandez-Mena, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 126 days.

(21) Appl. No.: 14/268,554

(22) Filed: May 2, 2014

(65) Prior Publication Data

US 2015/0315049 A1 Nov. 5, 2015

(51) Int. Cl.

*C02F 3/30* (2006.01)
*C02F 3/34* (2006.01)
*C02F 101/34* (2006.01)

(52) U.S. Cl.

CPC .............. *C02F 3/30* (2013.01); *C02F 2101/34* (2013.01); *C02F 2303/04* (2013.01)

(58) Field of Classification Search

CPC .......... C02F 3/30; C02F 3/34; C02F 2101/34; C02F 2303/04; C02F 2305/06
USPC .......... 210/605, 610, 611, 623, 630, 631, 909
See application file for complete search history.

(56) References Cited

U.S. PATENT DOCUMENTS

| | | | |
|---|---|---|---|
| 3,867,284 A | 2/1975 | Kappe et al. | |
| RE37,181 E | 5/2001 | Hunniford et al. | |
| 7,416,669 B1 * | 8/2008 | Carolan | C02F 3/006 210/614 |
| 7,799,215 B2 | 9/2010 | Matheis et al. | |

* cited by examiner

*Primary Examiner* — Fred Prince

(74) *Attorney, Agent, or Firm* — Mossman, Kumar & Tyler, P.C.

(57) ABSTRACT

An effective amount of at least one nitrogen-containing compound may be added to a wastewater stream within a water treatment system. The wastewater stream may have or include an aqueous-based fluid, a first bacteria, a second bacteria, organic acids, and combinations thereof. The first bacteria may be or include, but is not limited to, filamentous bacteria, *Zoogloea* bacteria, and combinations thereof. The second bacteria may be or include, but is not limited to facultative bacteria, spore-forming bacteria, phenol degrading bacteria, denitrifying bacteria, organic acid-degrading bacteria, high temperature bacteria, and combinations thereof. The addition of the nitrates to an anoxic zone within the wastewater treatment system may at least partially reduce the amount of the first bacteria within the wastewater stream as compared to an otherwise identical wastewater stream in the absence of the nitrogen-containing compound(s).

18 Claims, 1 Drawing Sheet

NITROGEN-CONTAINING COMPOUNDS FOR BACTERIAL CONTROL IN WATER BASED FLUIDS

TECHNICAL FIELD

The present invention relates to methods and water treatment systems for at least partially reducing an amount of a first bacteria within a wastewater stream by adding an effective amount of at least one nitrogen-containing composition to the wastewater stream.

BACKGROUND

Organic acids may be added to hydrocarbon fluids, such as heavy oil, Canadian crudes, shale oil, and the like to remove metals, amines, and eliminate emulsions therefrom. The organic acids added thereto may promote excessive filamentous bacterial growth and/or increase levels of slime-forming bacteria, e.g. *Zoogloea* within a wastewater stream produced from the hydrocarbon fluid. This bacterial growth may reduce sludge settling in clarifiers and cause operational problems within a wastewater system.

Effective handling of wastewater is an extremely important aspect of increasing the quality of life and conservation of clean water. The problems associated with simply discharging wastewater into water sources, such as rivers, lakes, and oceans are apparent—the biological and chemical wastes may create hazards to life forms including the potential spread of infectious diseases and exposure to carcinogenic chemicals. Therefore, wastewater treatment processes have evolved into systems ranging from the ubiquitous municipal wastewater treatment facilities, where sanitary wastewater from domestic populations is cleaned, to specialized industrial wastewater treatment processes, where specific pollutants in wastewater from various industrial applications must be addressed.

Biological and chemical compounds in certain wastewater streams may need to be reduced to a particular amount or removed altogether. Various attempts have been made to address treatment of such compounds. Therefore, it would be beneficial to discover new methods to treat wastewater and further reduce the amount of undesirable bacteria within the wastewater stream.

SUMMARY

There is provided, in one form, a method for adding an effective amount of at least one nitrogen-containing compound to a wastewater stream within a water treatment system. The wastewater stream may have or include an aqueous-based fluid, a first bacteria, a second bacteria, and at least one organic acid. The first bacteria may be or include filamentous bacteria, *Zoogloea* bacteria, and combinations thereof. The method may include at least partially reducing an amount of the organic acid(s), and at least partially reducing an amount of the first bacteria within the wastewater stream as compared to an otherwise identical wastewater stream absent the nitrogen-containing compound(s).

In an alternative non-limiting embodiment of the method, nitrogen-containing composition(s) may be added to at least one anoxic zone within the water treatment system having to obtain a nitrogen to carbon ratio of about 0.01 to 100. The method may include at least partially reducing an amount of the organic acid(s), and at least partially reducing an amount of the first bacteria within the anoxic zone as compared to an otherwise identical anoxic zone absent the nitrogen-containing composition(s). The anoxic zone(s) may be a return activated sludge (RAS) line downstream from an aeration basin, a secondary clarifier downstream from an aeration basin, a tank upstream from an aeration basin, an anoxic zone within the aeration basin, and combinations thereof.

There is provided, in another non-limiting embodiment, a water treatment system having a wastewater stream flowing therethrough, such as an influent wastewater stream flowing into the wastewater treatment system, at least one anoxic zone, an aeration basin, and an effluent wastewater stream flowing out of the water treatment system. The influent wastewater stream may flow into the water treatment system having at least a first bacteria and at least one organic acid. The first bacteria may be or include filamentous bacteria, *Zoogloea* bacteria, and combinations thereof. The anoxic zone may have or include the wastewater stream, an effective amount of at least one nitrogen-containing compound, and a second bacteria. The second bacteria may be or include facultative bacteria, spore-forming bacteria, phenol-degrading bacteria, denitrifying bacteria, organic acid-degrading bacteria, high temperature bacteria, and combinations thereof. The effluent wastewater stream may have or include a reduced amount of the first bacteria as compared to an otherwise identical effluent wastewater stream absent at least one nitrogen-containing compound.

In an alternative non-limiting embodiment of the water treatment system, the water treatment system may have a first anoxic zone located upstream from an aeration basin, and a second anoxic zone located downstream from the aeration basin. The wastewater stream may flow from the first anoxic zone to the aeration basin to the second anoxic zone and then back to the first anoxic zone as a loop until the amount of the first bacteria is reduced to a predetermined level.

The second bacteria may consume the organic acid(s) in the presence of the nitrogen-containing compounds, which decreases the amount of organic acids available for consumption by the first bacteria, and thereby reduces the amount of the first bacteria.

Figure 1:
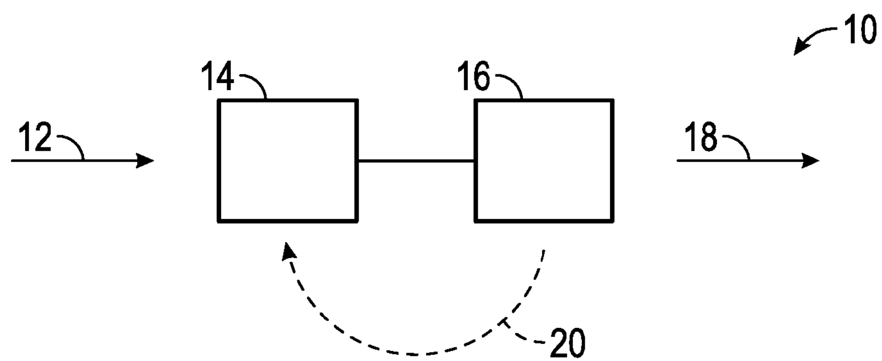
FIG. 1 is a diagram of one embodiment of the water treatment system having a first anoxic zone.

It will be appreciated that the system illustrated in the Figures are simply non-restrictive embodiments of the apparatus as described herein; the features of which are not necessarily to scale, and which may be reconfigured in design, orientation and appearance while still being encompassed by the methods and systems described and claimed herein.

DETAILED DESCRIPTION

It has been discovered that adding an effective amount of nitrogen-containing composition(s) to a wastewater stream may allow for a second bacteria to out-compete a first bacteria as compared to an otherwise identical wastewater stream in the absence of the nitrogen-containing composition(s). The aqueous-based wastewater fluid may be or include desalter wash water, overhead water from atmospheric or vacuum process units, strip sour water, coker blowdown, cooling water blowdown, boiler blowdown, oily water sewers, equalization tanks, cleaning solutions used for scale removal, water bottoms from storage tanks, API units, dissolved gas flotation units, and combinations thereof. 'Out-compete' is defined herein as the ability of the second bacteria to consume the organic acids at a faster rate than the first bacteria. The result may be a decline or elimination of the first bacteria population. While elimination of the first bacteria population is a worthwhile and acceptable goal, it will be appreciated that the methods described herein may be considered successful if a decline in the first bacteria population is achieved. The wastewater stream may have or include, but is not limited to, an aqueous-based fluid, a first bacteria, a second bacteria, at least one organic acid, and combinations thereof.

Organic acids may be present in a wastewater stream because the organic acids are added to crude oil to improve the removal of contaminants from the crude oil when processing the crude oil at a refinery, such as during a desalting process of the crude oil. The origin of organic acids may also include their presence in certain type of crudes. These crudes include, but are not limited to, heavy Canadian crudes, Venezuelan crudes, and shale oils. Organic acids may also be generated by anaerobic activity found in sewer systems and holding tanks within an industrial setting. However, organic acids present in the wastewater stream may increase the growth of bacteria that utilize the organic acids. The overgrowth of the bacteria may result in poor settling conditions in the water treatment system.

The first bacteria may be or include, but is not limited to, filamentous bacteria, *Zoogloea* bacteria, and combinations thereof. Non-limiting examples of the filamentous bacteria may be or include, but are not limited to *Nostocoida limicola, Thiothrix*, type 021N, type 0581, type 0411, other organisms, and combinations thereof. The type 021N, type 0581, type 0411 bacteria are filamentous bacteria that have been observed in wastewater systems but may not be grown outside of the wastewater treatment system. Such designations were devised by Dick Eikelboom, known by those skilled in the art of waste-water treatment systems. 'Other organisms' is defined herein to be any organism that has a selective advantage to proliferate when organic acids are present in a waste treatment system; such 'other organisms' may cause issues in the waste treatment system if they happen to over-proliferate. Non-limiting examples of the *Zoogloea* bacteria may be or include, but are not limited to amorphous *Zoogloea*, fingered *Zoogloea*, and combinations thereof. 'First bacteria' are defined herein as the bacteria that are targeted to be out-competed by the second bacteria; 'second bacteria' are defined herein as the bacteria that may out-compete the first bacteria for similar nutrients.

The second bacteria may out-compete the first bacteria in consuming the organic acid(s). The second bacteria may convert nitrate (—$NO_3$), nitrite (—$NO_2$), and/or a denitrification intermediate, and combinations thereof and consume the organic acids in the process in one non-limiting embodiment. A denitrification intermediate is defined herein as any intermediate associated with the denitrification process. The addition of nitrogen-containing composition(s) to the wastewater stream may allow for continuous de-nitrification to occur under anoxic conditions for consumption of the organic acids by the second bacteria. Ultimately, decreasing the amount of the organic acids available for the growth of the first bacteria may reduce the amount of the first bacteria.

The second bacteria may be or include, but is not limited to, facultative bacteria, spore-forming bacteria, phenol degrading bacteria, denitrifying bacteria, organic acid-degrading bacteria, high temperature bacteria, and combinations thereof. A non-limiting example of the second bacteria may be the bacterial additive known as CHEMCROBE 751™, which is distributed by Baker Hughes Incorporated.

Facultative bacteria may aerobically metabolize dissolved oxygen if present in the wastewater stream. However, the facultative bacteria may switch to an anaerobic metabolism or an anoxic metabolism in the absence of dissolved oxygen. Non-limiting examples of the facultative bacteria for out-competing the first bacteria may be or include, but is not limited to *Thiobacillus denitrificans, Micrococcus denitrificans, Paracoccus Alcagenes, Flavobacterium* and *Pseudomonas*, other facultative bacteria capable of consuming organic acids under anaerobic or anoxic conditions that may or may not also denitrify, and combinations thereof.

Spore-forming bacteria may form a spore, which is a stripped-down, dormant form of the bacteria that the bacteria may reduce itself into. Spore formation is usually triggered by a lack of nutrients available to the bacteria, and the spore enables the bacteria to lie dormant for extended periods of time. When the environment becomes more favorable, the spore may reactivate itself into its vegetative state. Most types of bacteria cannot change to the endospore form. Non-limiting examples of spore-forming bacteria may be or include *Bacillus, Clostridium*, and combinations thereof.

The phenol-degrading bacteria typically degrade phenols but may degrade nitrogen in the absence of phenol. Non-limiting examples of the phenol-degrading bacteria may be or include, but is not limited to *Azoarcus, Thauera, Streptococcus epidermis, Rhodococcus rhodochrous, Pseudomonas putida*, other phenol-degrading bacteria, and combinations thereof.

The denitrifying bacteria may metabolize nitrogenous compounds, such as those bacteria having a nitrate reductase enzyme in a non-limiting instance, where oxides may be turned back into nitrogen gas and/or nitrous oxides. Non-limiting examples of denitrifying bacteria may be or include, but is not limited to, *Paracoccus denitrificans, Pseudomonas stutzeri*, and combinations thereof.

The organic acid-degrading bacteria may degrade or otherwise inactivate an organic acid, such as glycolic acid, malic acid, acetic acid, lactic acid, butyric acid, propionic acid, and combinations thereof in a non-limiting example. The organic acid-degrading bacteria may use glycolic acid for energy and/or to produce carbon dioxide in a non-limiting embodiment. The organic acid-degrading bacteria may use acetic acid for growth, and the acetic acid may aid in formation of the bacteria cells in another non-limiting embodiment. The organic acid-degrading bacteria may be or include, but is not limited to *Paracoccus denitrificans, Pseudomonas stutzeri*, and combinations thereof.

The high temperature bacteria may exist at high temperatures ranging from about 25 C independently to about 46 C, or from about 35 C independently to about 43 C. Non-limiting examples of the high temperature bacteria may be or include bacteria that may grow at such high temperatures, which may be or include any of the bacteria mentioned herein.

In a non-limiting embodiment, the second bacteria may be added to the wastewater stream at a rate ranging from about 20 to about 100 pounds (lbs)/day per million gallons of wastewater stream for the first 3 days of operation. During days 4-7 of treating the wastewater stream, the amount of the second bacteria may be added to the wastewater stream in a reduced amount, such as from about 5 to about 40 lbs/day per million gallons of bioreactor flow.

The nitrogen-containing composition(s) may be or include, but are not limited to, nitrates, nitrites, denitrification intermediates, and combinations thereof. The nitrogen-containing composition(s) may be added to the water treatment system at a rate, such as, continuously, intermittently at consistent intervals, intermittently at inconsistent intervals, and combinations thereof. The effective amount of the nitrogen-containing composition(s) may have a nitrogen to carbon ratio of about 0.01 to 100, alternatively from about 0.05 independently to about 20, or from about 0.5 independently to about 1.

The nitrogen-containing composition(s) may be added to the wastewater stream when the wastewater stream has a temperature ranging from about 60° F. independently to about 110° F., or from about 85° F. independently to about 90° F. independently to about 99° F. in another non-limiting embodiment. As used herein with respect to a range, "independently" means that any lower threshold may be used together with any upper threshold to give a suitable alternative range.

The effective amount of the nitrogen-containing composition(s) may be added into at least one anoxic zone, such as a first anoxic zone only, a second anoxic zone only, and combinations thereof. The effective amount of the nitrogen-containing compound(s) may be divided between the anoxic zones depending on the desired outcomes. 'Anoxic zone' is defined herein to be any zone within the water treatment system where de-nitrification may occur and meet the metabolic needs of the second bacteria.

Since there are many variables, the dose rate should be used as a guide only. Factors that affect dose rates may include, but are not limited to, the concentration of organic acids in the influent stream, the amount of de-nitrifying bacteria present to consume the organic acids, pH, temperature, toxicity of influent wastewater, wastewater treatment goals, substrates (e.g. bacteria) to be treated, and desired effluent wastewater quality. Biological wastewater treatment plants may require substantially more bacteria than put forth here and many may use much less.

In a non-limiting embodiment, an additional additive may be added to the wastewater stream at the same time or different time as the nitrogen-containing composition(s). The additional additive may be or include, but is not limited to, denitrifying bacteria, phenol degrading bacteria, microorganisms, macroorganisms, micronutrients, macronutrients, trace elements, vitamins, and combinations thereof. Macronutrients may be or include, but are not limited to phosphorus (e.g. ortho $PO_4$), ammonia, other phosphorus containing compounds, amines or ammonia containing compounds, and the like. The amount of macronutrients within the wastewater may range from about 0.5 ppm independently to about 5 ppm, or from about 1 ppm independently to about 3 ppm.

The organic acids may be or include, but are not limited to, glycolic acid, malic acid, acetic acid, lactic acid, butyric acid, propionic acid, succinic acid, fumaric acid, benzoic acid, other water-soluble organic acids, alcohols, and combinations thereof. The second bacteria may consume the organic acids at a faster rate than the first bacteria. In addition to or in the alternative, the second bacteria may consume more of the organic acids in the presence of the nitrogen-containing composition(s) as compared to the amount of organic acids consumed by the second bacteria absent the nitrogen-containing composition(s).

The first anoxic zone within the water treatment system may be or include, but is not limited to a return activated sludge (RAS) line, a secondary clarifier, a tank upstream from an aeration basin, an anoxic zone within the aeration basin, and combinations thereof. The water treatment system may have or include an optional second anoxic zone that is different from the first anoxic zone, but may be a return activated sludge (RAS) line, a secondary clarifier, a tank upstream from an aeration basin, an anoxic zone within the aeration basin, and combinations thereof.

Turning to the Figures, FIG. 1 is a diagram of one embodiment of the water treatment system 10. The influent wastewater 12 flows into the water treatment system and into a first anoxic zone 14 upstream from the aeration basin 16. The nitrogen-containing compounds may be added to the first anoxic zone 14. The second bacteria may out-compete the first bacteria for available organic acids and thereby reduce the selective advantage of the first bacteria. This may lead to lower levels of the second bacteria and better wastewater system performance. Over time, the first bacteria may be starved out and may be replaced by second bacteria. The wastewater may flow from the first anoxic zone 14 to the aeration basin 16 and eventually out of the water treatment system as effluent wastewater 18. The effluent wastewater 18 may have a reduced amount of the first bacteria as compared to an otherwise identical effluent wastewater 18 absent the nitrogen-containing composition(s).

In a non-limiting instance, the wastewater may be flowed back to the anoxic zone 14 from the aeration basin 16 via a return activated sludge line (RAS) line 20 depending on the levels of the first and/or second bacteria present in the wastewater. In an alternative non-limiting embodiment, the nitrogen-containing composition may be added to the RAS line 20 in addition to or alternative to the first anoxic zone 14.

Figure 2:
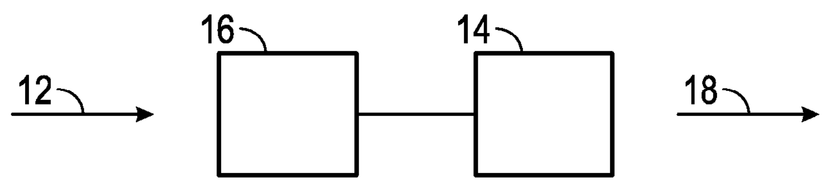
FIG. 2 is another non-limiting embodiment of the water treatment system where the first anoxic zone is downstream from an aeration basin.

FIG. 2 is another non-limiting embodiment of the water treatment system 10 where the first anoxic zone 14 may be downstream from the aeration basin 16 depending on the configuration of the water treatment system 10.

Figure 3:
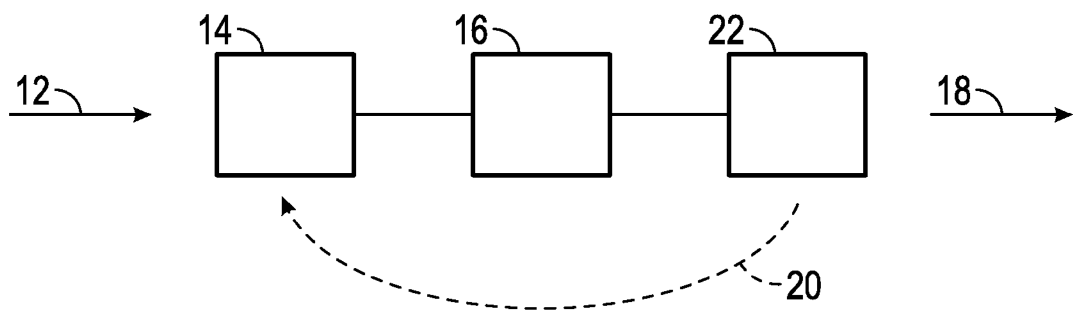
FIG. 3 is another non-limiting embodiment of the water treatment system having at least two anoxic zones.

FIG. 3 is another non-limiting embodiment of the water treatment system 10 having a second anoxic zone 22 in addition to the first anoxic zone 14. The second anoxic zone 22 may have an effective amount of the nitrogen-containing composition(s) added thereinto. The wastewater stream may flow from the first anoxic zone 14 to the aeration basin 16 to the second anoxic zone 22 and eventually out of the water treatment system 10 as effluent wastewater 18. In a non-limiting instance, the wastewater stream may be flowed from the second anoxic zone 22 back to the first anoxic zone 14 via a return activated sludge line (RAS) line 20 as a loop until the amount of the first bacteria is reduced to a desirable level. In an alternative non-limiting embodiment, the nitrogen-containing composition(s) may be added to the RAS line 20 in addition to or alternative to the first anoxic zone 14, the second anoxic zone 22, and combinations thereof.

In the foregoing specification, the invention has been described with reference to specific embodiments thereof, and has been described as effective in providing methods and water treatment systems for at least partially reducing an amount of a first bacteria within the wastewater stream as compared to an otherwise identical wastewater stream absent at least one nitrogen-containing compound. However, it will be evident that various modifications and changes can be made thereto without departing from the broader spirit or scope of the invention as set forth in the appended claims. Accordingly, the specification is to be regarded in an illustrative rather than a restrictive sense. For example, specific first bacteria, second bacteria, anoxic zones, nitrogen-containing composition(s), macronutrients, micronutrients, and organic acids falling within the claimed parameters, but not specifically identified or tried in a particular composition or method, are expected to be within the scope of this invention.

The present invention may suitably comprise, consist or consist essentially of the elements disclosed and may be practiced in the absence of an element not disclosed. For instance, the method may consist of or consist essentially of adding an effective amount of at least one nitrogen-containing compound to a wastewater stream having a first bacteria and at least one organic acid within a water treatment system, at least partially reducing an amount of organic acid(s) within the wastewater stream, and reducing an amount of the first bacteria within the wastewater stream as compared to an otherwise identical wastewater stream absent the nitrogen-containing compound(s); the first bacteria may be or include, but is not limited to, filamentous bacteria, amorphous *Zoogloea* bacteria, fingered *Zoogloea* bacteria, and combinations thereof; and the second bacteria may out-compete the first bacteria in consuming the organic acids.

The water treatment system having a wastewater stream flowing therethrough may consist of or consist essentially of an influent wastewater stream flowing into the wastewater treatment system, at least one anoxic zone, an aeration basin, and an effluent wastewater stream flowing out of the water treatment system having a reduced amount of the first bacteria as compared to an otherwise identical effluent wastewater stream absent the at least one nitrogen-containing compound(s); the influent wastewater stream may flow into the water treatment system having at least a first bacteria and at least one organic acid where the first bacteria may be or include filamentous bacteria, amorphous *Zoogloea* bacteria, fingered *Zoogloea* bacteria, and combinations thereof; the anoxic zone may have or include may have or include the wastewater stream, an effective amount of at least one nitrogen-containing compound, and a second bacteria; the second bacteria may be or include facultative bacteria, spore-forming bacteria, phenol degrading bacteria, denitrifying bacteria, organic acid-degrading bacteria, high temperature bacteria, and combinations thereof.

What is claimed is:

1. A method comprising:

adding an effective amount of at least one nitrogen-containing composition to a wastewater stream within a water treatment system; wherein the wastewater stream comprises an aqueous-based fluid, a first bacteria, a second bacteria, and at least one organic acid; and wherein the first bacteria is selected from the group consisting of filamentous bacteria, *Zoogloea* bacteria, and combinations thereof; and whereby the second bacteria out-competes the first bacteria in consuming the at least one organic acid;

at least partially reducing an amount of the at least one organic acid; and at least partially reducing an amount of the first bacteria within the wastewater stream as compared to an otherwise identical wastewater stream absent the at least one nitrogen-containing composition.

2. The method of claim 1, wherein the at least one nitrogen-containing composition is selected from the group consisting of nitrates, nitrites, a denitrification intermediate, and combinations thereof.

3. The method of claim 1, wherein the second bacteria is selected from the group consisting of facultative bacteria, spore-forming bacteria, phenol degrading bacteria, denitrifying bacteria, organic acid-degrading bacteria, high temperature bacteria, and combinations thereof.

4. The method of claim 1, wherein the second bacteria consumes more of the at least one organic acid in the presence of the at least one nitrogen-containing composition as compared to an otherwise identical wastewater stream absent the at least one nitrogen-containing composition.

5. The method of claim 1, wherein the at least one organic acid is selected from the group consisting of glycolic acid, malic acid, acetic acid, lactic acid, butyric acid, propionic acid, succinic acid, fumaric acid, benzoic acid and combinations thereof.

6. The method of claim 1, wherein the at least one nitrogen-containing composition is added to at least one anoxic zone within the water treatment system selected from the group consisting of a return activated sludge (RAS) line, a secondary clarifier downstream from an aeration basin, a tank upstream from an aeration basin, an anoxic zone within the aeration basin, and combinations thereof.

7. The method of claim 1, wherein the adding the at least one nitrogen-containing composition to the wastewater stream occurs at a rate selected from the group consisting of continuously, intermittently at consistent intervals, intermittently at inconsistent intervals, and combinations thereof.

8. The method of claim 1, wherein the adding the at least one nitrogen-containing composition to the wastewater stream occurs at a nitrogen to carbon ratio of about 0.01:1 to about 100:1.

9. The method of claim 1, wherein the wastewater stream is selected from the group consisting of desalter wash water, overhead water from atmospheric or vacuum process units, strip sour water, coker blowdown, cooling water blowdown, boiler blowdown, oily water sewers, equalization tanks, cleaning solutions used for scale removal, water bottoms from storage tanks, API units, dissolved gas flotation units, and combinations thereof.

10. A method comprising:

adding at least one nitrogen-containing composition to at least one anoxic zone within a water treatment system in an amount ranging from a nitrogen to carbon ratio of about 0.01:1 to about 100:1, wherein the anoxic zone comprises a wastewater stream, a first bacteria, a second bacteria, and at least one organic acid; wherein the first bacteria is selected from the group consisting of filamentous bacteria, *Zoogloea* bacteria, and combinations thereof; and wherein the second bacteria is selected from the group consisting of facultative bacteria, spore-forming bacteria, phenol degrading bacteria, denitrifying bacteria, organic acid-degrading bacteria, high temperature bacteria, and combinations thereof;

at least partially reducing an amount of the at least one organic acid;

at least partially reducing an amount of the first bacteria within the at least one anoxic zone as compared to an otherwise identical anoxic zone absent the at least one nitrogen-containing composition; and wherein the at least one anoxic zone within the water treatment system is selected from the group consisting of a return activated sludge (RAS) line downstream from an aeration basin, a secondary clarifier downstream from an aeration basin, a tank upstream from an aeration basin, an anoxic zone within the aeration basin, and combinations thereof.

11. A water treatment system having a wastewater stream flowing therethrough, the water treatment system comprising:

an influent wastewater stream flowing into the water treatment system having at least a first bacteria and at least one organic acid; wherein the first bacteria is selected from the group consisting of filamentous bacteria, *Zoogloea* bacteria, and combinations thereof;

at least one anoxic zone comprising the influent wastewater stream, an effective amount of at least one nitrogen-containing composition, and a second bacteria; wherein the second bacteria is selected from the group consisting of facultative bacteria, spore-forming bacteria, phenol degrading bacteria, denitrifying bacteria, organic acid-degrading bacteria, high temperature bacteria, and combinations thereof;

an aeration basin;

an effluent wastewater stream flowing out of the water treatment system; and wherein the effluent wastewater stream comprises a reduced amount of the first bacteria as compared to an otherwise identical effluent wastewater stream absent the at least one nitrogen-containing composition.

12. The water treatment system of claim 11, wherein the at least one anoxic zone is selected from the group consisting of a tank upstream from the aeration basin, a return activated sludge (RAS) line downstream from the aeration basin, a secondary clarifier downstream from the aeration basin, an anoxic zone within the aeration basin, and combinations thereof.

13. The water treatment system of claim 11, wherein the water treatment system comprises a first anoxic zone upstream from the aeration basin and a second anoxic zone downstream from the aeration basin; and wherein the wastewater stream flows from the first anoxic zone to the aeration basin to the second anoxic zone and then back to the first anoxic zone as a loop until the amount of the first bacteria is reduced to a predetermined level.

14. The water treatment system of claim 11, wherein the at least one nitrogen-containing composition is selected from the group consisting of nitrates, nitrites, a denitrification intermediate, and combination thereof.

15. The water treatment system of claim 11, wherein the at least one organic acid is selected from the group consisting of glycolic acid, malic acid, acetic acid, lactic acid, butyric acid, propionic acid, succinic acid, fumaric acid, benzoic acid, and combinations thereof.

16. The water treatment system of claim 11, wherein the effective amount of the at least one nitrogen-containing composition ranges from a nitrogen to carbon ratio of about 0.01:1 to about 100:1.

17. The water treatment system of claim 11, wherein the influent wastewater stream is selected from the group consisting of desalter wash water, overhead water from atmospheric or vacuum process units, strip sour water, coker blowdown, cooling water blowdown, boiler blowdown, oily water sewers, equalization tanks, cleaning solutions used for scale removal, water bottoms from storage tanks, API units, dissolved gas flotation units, and combinations thereof.

18. A water treatment system having a wastewater stream flowing therethrough, the water treatment system comprising:

an influent wastewater stream flowing into the water treatment system having at least a first bacteria, and at least one organic acid; wherein the first bacteria is selected from the group consisting of filamentous bacteria, *Zoogloea* bacteria, and combinations thereof;

a first anoxic zone upstream from an aeration basin;

the aeration basin;

a second anoxic zone downstream from the aeration basin; wherein the wastewater stream flows from the first anoxic zone to the aeration basin to the second anoxic zone and then back to the first anoxic zone as a loop until the amount of the first bacteria is reduced to a predetermined level;

an effluent wastewater stream flowing out of the water treatment system; and wherein the first anoxic zone, the second anoxic zone, and combinations thereof comprise the influent wastewater stream, an effective amount of at least one nitrogen-containing composition for the influent wastewater stream, and a second bacteria; and wherein the second bacteria is selected from the group consisting of facultative bacteria, spore-forming bacteria, phenol degrading bacteria, denitrifying bacteria, organic acid-degrading bacteria, high temperature bacteria, and combinations thereof.

* * * * *